United States Patent [19]

Kervagoret

[11] Patent Number: 5,404,791

[45] Date of Patent: Apr. 11, 1995

[54] PRESSURE REGULATION DEVICE FOR A HYDRAULIC SYSTEM

[75] Inventor: Gilbert Kervagoret, Argenteuil, France

[73] Assignee: AlliedSignal Europe Services Techniques, Drancy, France

[21] Appl. No.: 50,202

[22] PCT Filed: Oct. 7, 1992

[86] PCT No.: PCT/FR92/00928

§ 371 Date: May 4, 1993

§ 102(e) Date: May 4, 1993

[87] PCT Pub. No.: WO90/05658

PCT Pub. Date: May 31, 1990

[30] Foreign Application Priority Data

Oct. 31, 1991 [FR] France .................. 91 13481

[51] Int. Cl.$^6$ ...................................... F15B 13/044
[52] U.S. Cl. ........................................ 91/433; 91/454;
137/596.17; 137/625.64; 303/119.2
[58] Field of Search ................... 91/433, 459;
137/596.17, 625.65; 303/119.2

[56] References Cited

U.S. PATENT DOCUMENTS

| 4,744,389 | 5/1989 | Ichihashi . | |
|---|---|---|---|
| 5,234,030 | 8/1993 | Kervagoret et al. | 137/596.17 |
| 5,248,191 | 9/1993 | Kondo et al. | 303/117.1 |

FOREIGN PATENT DOCUMENTS

| 0254483 | 1/1988 | European Pat. Off. . |
| 0357964 | 8/1989 | European Pat. Off. . |
| 3-276853 | 12/1991 | Japan . |
| 90/05658 | 5/1990 | WIPO . |
| 91/15388 | 10/1991 | WIPO . |

OTHER PUBLICATIONS

Fabian et al, Machine Design, pp. 59–62, Jan. 24, 1991.

*Primary Examiner*—Gerald A. Michalsky
*Attorney, Agent, or Firm*—Larry J. Palguta

[57] ABSTRACT

The invention relates to a pressure regulation device for a hydraulic system comprising at least one generator (30) of fluid under pressure, a hydraulic actuator (28) and a reservoir (32) of fluid under low pressure, and including an electrovalve controlled by a computer and comprising in a casing (9) an electrical coil (10) and a sliding magnetic core (12) controlling a slide valve (16) sliding in a bore provided in a body (18), the slide valve (16) determining two chambers (22, 36) arranged on either side of the slide valve (16) in the bore, the slide valve comprising a hydraulic chamber (40) communicating with the hydraulic actuator (28) and determining a reaction force adding itself to the force produced by the coil (10), against a prestressed resilient means (20). The hydraulic chamber (40) is delimited by a bore (41) made in the slide valve (16), an end part (43a) of a sleeve (43), a rod (42) and a cup (60) for leaktightness between the rod (42) and the bore (41) of the slide valve (16).

8 Claims, 1 Drawing Sheet

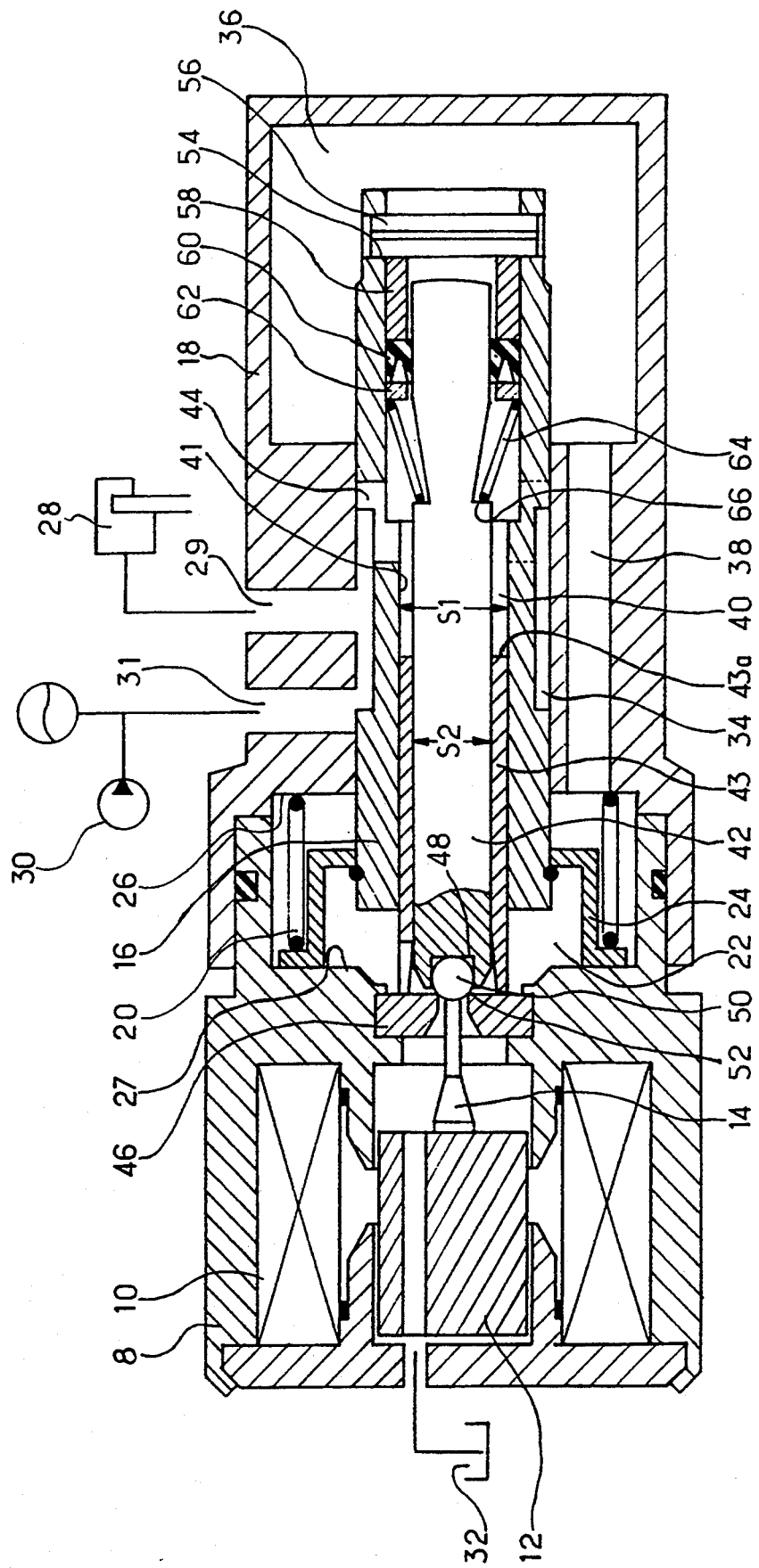

PRESSURE REGULATION DEVICE FOR A HYDRAULIC SYSTEM

The invention relates to a pressure regulation device for a hydraulic system.

It is particularly adapted to the braking systems of motor vehicles with antilocking of the wheels when braking. Present antilocking systems use, between a source of fluid under pressure and a receiver such as a hydraulic brake actuator, an electrovalve controlled by a computer in terms of signals representative of the rotation of the wheels of the vehicle in order, in a general manner, to release the pressure of the fluid in the hydraulic actuator when the computer detects the imminence of the locking of a wheel, and then to connect a second source of fluid under pressure in order to raise the pressure once again, up to a new detection of imminence of locking, the cycle then renewing itself. Electrovalves of the same type are used in anti-wheelspin systems in order to generate a pressure in a brake actuator of a driving wheel when the computer detects a tendency of this driving wheel to spin, and then to release this pressure when the tendency to spin has disappeared.

The electrovalves used are electrovalves with all-or-nothing operation. However, the antilocking or anti-wheelspin periods wherein cycles as described above follow one another, last for a very short time during which the electrovalve changes state a very large number of times. This causes an unpleasant noise of hammering of the movable part of the electrovalve.

Moreover, as the system operates in all-or-nothing manner, surges of pressure appear in the brakes producing poorly controlled transient conditions.

The object of the present invention is to obviate these disadvantages by using an electrovalve termed proportional ensuring in the user system a hydraulic pressure dependent on the current circulating in the coil of the electrovalve in a given range of displacement of the magnetic core of the electrovalve.

Such an electrovalve then has the advantage of being controllable simply by causing the current circulating in the coil to vary without necessitating hammering of the movable part; this therefore results in a major reduction in the pressure surges in the brakes. Furthermore, such an electrovalve may easily be controlled by a computer producing a chopping at variable frequency of a direct current such as is found on board a motor vehicle, or else a chopping at fixed frequency and with variable cyclic ratio, the intensity of the current integrated by the coil then being dependent on the cyclic ratio.

Such an electrovalve is for example described in U.S. Pat. No. 4,744,389. However, the electrovalve described in that Document cannot be arranged in a hydraulic braking system with antilocking of the wheels because of the pressures used, particularly during the energizing of the electrovalve. In fact, the electrovalve of that Document is designed in order to function continuously in a system for regulation of a relatively low pressure. This physical limitation therefore prohibits the use of such an electrovalve with high pressures in the hydraulic actuator. Furthermore, that electrovalve does not permit the pressure to be caused to increase linearly when the current decreases linearly in the coil and vice versa.

One object of the present invention is to produce an electrovalve serving to cause the pressure to vary linearly in terms of the current in the coil, capable of being energized with a high pressure in the hydraulic system, and which is of simple design and assembly.

The subject of the present invention is therefore a pressure regulation device for a hydraulic system comprising at least one generator of fluid under pressure, a hydraulic actuator and a reservoir of fluid under low pressure, and including an electrovalve controlled by a computer and comprising in a casing an electrical coil and a sliding magnetic core controlling a slide valve sliding in a bore provided in a body, the slide valve determining two chambers arranged on either side of the slide valve in the bore, the slide valve comprising a hydraulic chamber communicating with the hydraulic actuator and determining a reaction force adding itself to the force produced by the coil, against a prestressed resilient means.

According to the invention, the chamber is delimited by a bore made in the slide valve, an end part of a sleeve, a rod and a cup for leaktightness between the rod and the bore of the slide valve.

The invention will now be described by way of example with reference to the accompanying drawing in which:

the single FIGURE shows diagrammatically in section an embodiment of a device according to the present invention in rest position.

It is known that the coil of electrovalves termed proportional, has the essential feature of being capable of providing a substantially constant force for a given current in a non-negligible range of displacement of the magnetic core, of the order of 2 to 3 mm. This feature is generally obtained by means of a special geometry of the polar parts. This feature is used in the present invention in order to ensure the required function by modulation of the current circulating in the coil so as to avoid operation with a movable part hammering very rapidly.

In the FIGURE, such an electrovalve can be seen, comprising in a casing 8 a coil 10 for energization, a sliding magnetic core 12 provided with its push rod 14. The hydraulic part of the electrovalve is constituted by a slide valve 16 sliding in a bore of a body 18. A prestressed spring 20 is arranged in a chamber 22 for example between a cup 24 integral with the slide valve 16 and a wall 26 of the body 18 so as to pull the slide valve 16 towards its rest position shown in the FIGURE, bearing against a wall 27 of the casing 8 facing the wall 26.

The slide valve 16 is machined so as to be capable of opening or closing a communication between hydraulic actuator 28 connected to a duct 29, a source of fluid under pressure 30 connected to a duct 31 and a reservoir 32 in accordance with the systems for regulation of hydraulic pressure in general use. For this purpose, a groove 34 is provided at the periphery of the slide valve 16.

The two chambers 22 and 36 located on either side of the slide valve 16 in the bore are at the same pressure owing to a drilling 38 made in the body 18. A chamber 40 determines on the slide valve 16 a reaction force. This chamber 40 is formed in a bore 41 of section S1 of the slide valve 16, between this bore 41 and a rod 42 of section S2 less than S1.

Between the bore 41 and the rod 42 is arranged a sleeve 43 sliding in substantially leaktight manner in the bore 41, and wherein slides in substantially leaktight manner the rod 42. The active end 43a of the sleeve 43 therefore presents an annular surface equal to S1−S2, and contributes to delimiting of the chamber 40. The latter communicates with the groove 34 by means of a radial drilling or opening 44 in the slide valve 16.

The sleeve 43 bears against the wall 27 of the casing 8 or against a part 46 integral with the casing 8. The rod 42 is shaped at one end with a recess 48 containing in slightly floating manner a ball 50 cooperating with a seating 52 formed on the casing 8 or on the part 46 which is integral with it. The "floating" mounting of the ball 50 in the recess 48 has the object of obtaining a perfect cooperation of the ball 50 with the seating 52, whatever the defects of concentricity between the bore 41, the sleeve 43 and the rod 42 due to the production tolerances.

The slide valve 16 is moreover shaped at its end other than that which bears the cup 24 with radial apertures 54 intended to receive a pin 56. This pin serves as stop for a sleeve 58 for retaining a seal or a cup 60 ensuring the leaktightness between the bore 41 of the slide valve 16 and the rod 42. A washer 62 bears against the cup 60 and serves as stop for a spring 64 bearing moreover on a step 66 formed on the rod 42. The cup 60 thus ensures the leaktightness between the chamber 40 and the chamber 36.

It will therefore be seen that the spring 64 serves as return spring for the ball valve 50-52. It will be seen on the other hand that the cup 60 also permits the defects of concentricity between the bore 41, the sleeve 43 and the rod 42 to be taken up. Lastly, it will be seen that, owing to this advantageous arrangement according to the invention, all of the components of the electrovalve are assembled solely by movements of axial direction, with the exception of the pin 56 which is put into place at the completion of assembly in a radial direction, having to pass through only a single part, namely the slide valve 16. The electrovalve according to the invention is therefore particularly simple to machine since it does not necessitate strict dimensional accuracy, and simple to assemble, as we have just seen. It is therefore very inexpensive, and of simple, reliable and silent operation as will now be described.

In rest position, as shown, the source of fluid under pressure 30 is in communication with the actuator 28 via the groove 34, and the chamber 40 is in communication with the actuator 28. The two end chambers 22 and 36 communicate with one another and are isolated from the reservoir 32 by the valve 50 resting on its seating 52.

When the electrovalve is energized, for example in a period of antilocking of the wheels in the context of the preferred application of the invention, first of all the current circulating in the coil produces a force opposing that of the spring 64 in order to raise the ball 50, borne by the rod 42, from its seating 52 and to open the communication between the chamber 22 and the reservoir 32. The push rod 14, in continuing its action on the ball 50, will next cause the other end of the rod 42 to come into contact with the pin 56. At that moment, the force exerted by the push rod 14 must oppose the force of the control spring 20 in order to cause the slide valve 16 to move. The force is exerted by the push rod 14 against that of the spring 20 whatever the pressure prevailing in the hydraulic system. This in particular enables the electrovalve not to have a substantial electrical consumption. The opening of the valve 50, 52 and the placing of the chambers 22 and 36 in communication with the reservoir 32 takes place before the current in the coil 10 reaches its nominal intensity. Then the intensity being nominal, the rod 42 is stopped against the slide valve 16 through the intermediary of the pin 56, and the movement of the slide valve 16, against the spring 20, closes the duct 31 thus isolating the source of fluid under pressure 30 from the actuator 28. Because of the position of the groove 34, the latter communicates with the chamber 36 and, consequently, with the reservoir 32. A release of the pressure of the fluid in the actuator therefore occurs. It will have been understood that the movement of the slide valve 16 against the spring 20 is produced by the current in the coil 10 and is promoted by the hydraulic reaction in the chamber 40 on the reaction surface $S=S1-S2$ which produces a reaction force adding itself to that produced by the coil and opposing that produced by the control spring 20. By reducing the intensity of the current in the coil, the pressure having fallen in the actuator 28, the hydraulic reaction force due to the chamber 40 diminishes and the slide valve moves in the other direction, closing the communication between the actuator 28 and the chamber 36, and therefore the reservoir 32, and afterwards re-establishing if necessary the communication between the source 30 and the actuator 28 permitting the pressure to rise again in the actuator 28.

If the intensity of the current in the coil is increased, the pressure will fall again in the actuator 28 since the communication between the actuator and the reservoir 32 via the groove 34 and the chambers 22 and 36 will be reopened.

It is therefore found that an increase of the current in the coil results in a reduction of the pressure of the fluid in the actuator 28. It will then be seen that by modulating, for example by chopping, the current circulating in the coil 10, the slide valve 16 will adopt a position which is a function of the pressure prevailing in the chamber 40, and it will be possible, by judiciously controlling this current, to apply the desired fluid pressure to the actuator 28. In fact, the hydraulic reaction generated in the chamber 40 will automatically open or close the communications between the actuator 28 and the source of fluid under pressure 30 and between the actuator 28 and the reservoir 32 for each given value of the intensity of the current circulating in the coil 10. By judicious selection of the reaction section $S=S1-S2$, it will therefore be possible to dimension the coil 10 so that the electrical consumption is as low as possible, taking account of the pressures involved.

Moreover, owing to the arrangement of the sleeve 43, of the slide valve 16 and of the rod 42, the device of the invention is particularly simple to assemble and to dismantle, and therefore to maintain.

Although only one specific embodiment of the invention has been described, it is obvious that a person skilled in the art will be capable of making many modifications to it without going beyond the scope of the invention as defined by the accompanying claims.

I claim:

1. A pressure regulation device for a hydraulic system comprising at least one generator of fluid under pressure, a hydraulic actuator and a reservoir of fluid under low pressure, and including an electrovalve controlled by a computer and comprising in a casing an electrical coil and a sliding magnetic core controlling a slide valve sliding in a bore provided in a body, the slide valve determining two chambers arranged on either side of the slide valve in the bore, the slide valve comprising a hydraulic chamber communicating with the hydraulic actuator and determining a reaction force added to the force produced by the coil and against prestressed resilient means, characterized in that the hydraulic chamber is delimited by a bore in the slide valve, an end part of a sleeve, a rod and a cup for leaktightness between the rod and the bore of the slide valve.

2. The device according to claim 1, characterized in that a radial opening causes the hydraulic chamber to communicate with a groove provided at the periphery of the slide valve.

3. The device according to claim 2, characterized in that the sleeve bears against one of a wall of the casing and a part integral with the casing.

4. The device according to claim 3, characterized in that the sleeve slides in substantially leaktight manner in the bore of the slide valve and receives slidably in substantially leaktight manner the rod.

5. The device according to claim 4, characterized in that the reaction force is exerted on an annular surface of the end part of the sleeve.

6. The device according to claim 5, characterized in that a spring for return of a ball valve is arranged between the cup and a step of the rod.

7. The device according to claim 6, characterized in that the cup is retained operatively by a pin passing through radial apertures in the slide valve.

8. The device according to claim 7, characterized in that the ball of the ball valve is contained in a slightly floating manner in a recess at one end of the rod.

* * * * *